US012625057B2

(12) United States Patent
Hong et al.

(10) Patent No.: US 12,625,057 B2
(45) Date of Patent: May 12, 2026

(54) MULTI-SPECTRAL DIGITAL INLINE HOLOGRAPHY FOR BIOLOGICAL PARTICLE CLASSIFICATION

(71) Applicant: Regents of the University of Minnesota, Minneapolis, MN (US)

(72) Inventors: Jiarong Hong, New Brighton, MN (US); Ruichen He, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 141 days.

(21) Appl. No.: 18/557,517

(22) PCT Filed: Apr. 29, 2022

(86) PCT No.: PCT/US2022/072030
§ 371 (c)(1),
(2) Date: Oct. 26, 2023

(87) PCT Pub. No.: WO2022/232849
PCT Pub. Date: Nov. 3, 2022

(65) Prior Publication Data
US 2024/0219287 A1 Jul. 4, 2024

Related U.S. Application Data

(60) Provisional application No. 63/201,477, filed on Apr. 30, 2021.

(51) Int. Cl.
*G01N 15/1434* (2024.01)
*B01L 3/00* (2006.01)
(Continued)

(52) U.S. Cl.
CPC .... *G01N 15/1434* (2013.01); *B01L 3/502715* (2013.01); *G01N 15/01* (2024.01);
(Continued)

(58) Field of Classification Search
CPC ............... G06V 20/695; G06V 20/698; B01L 2300/0819; B01L 2300/168;
(Continued)

(56) References Cited

U.S. PATENT DOCUMENTS 10,895,843 B2 1/2021 Hong et al.
11,150,605 B1 * 10/2021 Xiao ..................... G06N 3/045
(Continued)

FOREIGN PATENT DOCUMENTS

CN 110455799 A 8/2019
CN 111780684 A 8/2019
(Continued)

OTHER PUBLICATIONS

Amalfitano et al., "Responses of Benthic Bacteria to Experimental Drying in Sediments from Mediterranean Temporary Rivers", Microb Ecol, vol. 55, Jun. 2007, pp. 270-279.
(Continued)

*Primary Examiner* — Md M Rahman
(74) *Attorney, Agent, or Firm* — Shumaker & Sieffert, P.A.

(57) ABSTRACT

A system and method for characterizing biological particles. A multi-spectral digital inline holographic includes a computing system, a camera and a light source having a. coherent multi-spectral beam of light. Tire light source illuminates a sample having one or more biological particles and the camera captures holograms produced by interference of (i) light from the coherent multi-spectral beam of light that was scattered by the sample with (ii) light from the coherent multi-spectral beam of light that was not scattered, by the sample, the captured holograms including holograms from two or more spectral bands. The computing system applies a machine learning model to the captured holograms
(Continued)

to extract features of the biological particles m the sample from the captured holograms.

7 Claims, 12 Drawing Sheets

(51) Int. Cl.

| | |
|---|---|
| *G01N 15/01* | (2024.01) |
| *G06V 10/143* | (2022.01) |
| *G06V 10/26* | (2022.01) |
| *G06V 10/774* | (2022.01) |
| *G06V 10/82* | (2022.01) |
| *G06V 20/69* | (2022.01) |

(52) U.S. Cl.
CPC ............ *G06V 10/143* (2022.01); *G06V 10/26* (2022.01); *G06V 10/774* (2022.01); *G06V 10/82* (2022.01); *G06V 20/693* (2022.01); *G06V 20/695* (2022.01); *G06V 20/698* (2022.01); *B01L 2300/0819* (2013.01); *B01L 2300/168* (2013.01)

(58) Field of Classification Search
CPC ....... G01N 15/1433; G01N 2015/1493; G01N 2015/1497; G01N 2015/0233; G01N 2015/1454; G01N 15/0227; G06N 3/0464; G06N 3/09; G06N 3/096; G06N 3/045; G06N 3/048; G06N 3/08; G03H 1/0808; G03H 1/0866; G03H 1/0443; G03H 2001/0447
USPC ......................................................... 356/338
See application file for complete search history.

(56) References Cited

U.S. PATENT DOCUMENTS

| | | | | |
|---|---|---|---|---|
| 2014/0286478 | A1* | 9/2014 | Paulus ................... | G01N 23/20 |
| | | | | 378/88 |
| 2017/0031318 | A1 | 2/2017 | Richard et al. | |
| 2018/0018106 | A1 | 1/2018 | Lee | |
| 2019/0011882 | A1 | 1/2019 | Gusyatin | |
| 2020/0096434 | A1 | 3/2020 | Deran | |
| 2020/0285194 | A1 | 9/2020 | Abdulkadir et al. | |
| 2023/0343108 | A1* | 10/2023 | Hemantharaja ........ | G06V 10/82 |

FOREIGN PATENT DOCUMENTS

| | | |
|---|---|---|
| EP | 3671176 A1 | 6/2020 |
| KR | 20180105332 | 9/2018 |
| WO | 2019171453 A1 | 9/2019 |

OTHER PUBLICATIONS

Anto et al., "Algae as green energy reserve: Technological outlook on biofuel production", Chemosphere, vol. 242, Mar. 2020, pp. 1-16.

Ashida et al., "Isolation of functional single cells from environments using a micromanipulator: application to study denitrifying bacteria", Appl Microbio Biotechnol, Nov. 20, 2009, pp. 1211-1217.

Barer et al., "Refractometry of living cells", Nature, Apr. 25, 1953, pp. 720-724.

Bertevello et al., "Lipid identification and transcriptional analysis of controlling enzymes in bovine ovarian follicle", International Journal of Molecular Sciences, Oct. 2018, 31 pp.

Bian et al., "Portable multi-spectral lens-less microscope with wavelength-self-calibrating imaging sensor", Optics and Lasers in Engineering, vol. 111, Dec. 2018, pp. 25-33.

Bista et al., "Quantification of nanoscale nuclear refractive index changes during the cell cycle", Journal of Biomedical Optics, Jul. 2011, 4 pp.

Bochkovskiy et al., "Yolov4: Optimal speed and accuracy of object detection", arXiv preprint, Apr. 23, 2020, 17 pp.

Bosshard et al., "Solar disinfection (SODIS) and subsequent dark storage of *Salmonella typhimurium* and Shigella flexneri monitored by flow cytometry", Microbiology, Dec. 2008, pp. 1310-1317.

Chen et al., "Deep learning in label-free cell classification", Scientific Reports, Mar. 2016, 16 pp.

Choi et al., "Full-field optical coherence microscopy for identifying live cancer cells by quantitative measurement of refractive index distribution", Full-field optical coherence microscopy for identifying live cancer cells by quantitative measurement of refractive index distribution, vol. 18, No. 22, Oct. 10, 2010, 11 pp.

Comandatore et al., "Modeling the Life Cycle of the Intramitochondrial Bacterium "*Candidatus midichloria mitochondrii*" Using Electron Microscopy Data", Using Electron Microscopy Data. MBio, vol. 12, No. 3, Jul. 2021, 13 pp.

Delvigne et al., "Microbial heterogeneity affects bioprocess robustness: Dynamic single-cell analysis contributes to understanding of microbial populations", Biotechnology Journal, Sep. 2013, pp. 61-72.

Dharmawan et al., "Nonmechanical parfocal and autofocus features based on wave propagation distribution in lensfree holographic microscopy", Scientific Reports, vol. 11, No. 3213, Feb. 5, 2021, 16 pp.

Feizi et al., "Rapid, portable and cost-effective yeast cell viability and concentration analysis using lensfree on-chip microscopy and machine learning", Lap Chip, vol. 16, No. 22, Sep. 2016, pp. 4350-4358.

Feng et al., "An Optimized SYBR Green I/PI Assay for Rapid Viability Assessment and Antibiotic Susceptibility Testing for Borrelia burgdorferi", PLOS One, vol. 9, No. 11, Nov. 2014, 8 pp.

Go et al., "Label-free sensor for automatic identification of erythrocytes using digital in-line holographic microscopy and machine learning", Biosensors and Bioelectronics, vol. 103, Apr. 2018, pp. 12-18.

Go et al., "Machine learning-based in-line holographic sensing of unstained malaria-infected red blood cells", Journal of Biophotonics, Apr. 19, 2018, 16 pp.

Guo et al., "High-quality multi-wavelength lensfree microscopy based on nonlinear optimization", Optics and Lasers in Engineering, vol. 137, Feb. 2021, 8 pp.

Gurunathan et al., "Review of the isolation, characterization, biological function, and multifarious therapeutic approaches of exosomes", vol. 8, No. 4, Apr. 3, 2019, 36 pp.

Herve et al., "Alternation of inverse problem approach and deep learning for lens-free microscopy image reconstruction", Scientific Reports, vol. 10, No. 20207, Nov. 19, 2020, 12 pp.

Hu et al., "Biological Aerosol Particles in Polluted Regions", Current Pollution Reports, Feb. 22, 2020, 25 pp.

International Preliminary Report on Patentability from International Application No. PCT/US2022/072030 dated Nov. 9, 2023, 9 pp.

International Search Report and Written Opinion of International Application No. PCT/US2022/072030 dated Sep. 1, 2022, 13 pp.

Jaye et al., "Translational applications of flow cytometry in clinical practice", The Journal of Immunology, May 15, 2012, pp. 4715-4719.

Jo et al., "Label-free identification of individual bacteria using Fourier transform light scattering", Optics express, vol. 23, No. 12, Jun. 15, 2015, 14 pp.

Katz et al., "Applications of holography in fluid mechanics and particle dynamics", Annual Review of Fluid Mechanics, Jan. 2010, pp. 531-555.

Kim et al., "Rapid and label-free identification of individual bacterial pathogens exploiting three-dimensional quantitative phase imaging and deep learning", BioRxiv, Apr. 2019, 20 pp.

Kumar et al., "Digital Fresnel reflection holography for highresolution 3D near-wall flow measurement", vol. 26, No. 10, May 14, 2018, 11 pp.

Lee et al., "Rapid profiling of bovine and human milk gangliosides by matrix-assisted laser desorption/ionization Fourier transform ion cyclotron resonance mass spectrometry", International journal of mass spectrometry, vol. 305, No. 2-3, Aug. 2011, pp. 138-150.

(56) References Cited

OTHER PUBLICATIONS

Li et al., "Accurate label-free 3-part leukocyte recognition with single cell lens-free imaging flow cytometry", Comput Biol Med, May 1, 2018, pp. 147-156.

Li et al., "Overview of primary biological aerosol particles from a Chinese boreal forest: Insight into morphology, size, and mixing state at microscopic scale", Science of the Total Environment, vol. 719, Jun. 2020, 14 pp.

Lindstrom et al., "The role of physiological heterogeneity in microbial population behavior", Nature Chemical Biology, vol. 6, Sep. 17, 2010, pp. 705-712.

Molaei et al., "Imaging bacterial 3D motion using digital in-line holographic microscopy and correlation-based de-noising algorithm", Optics Express, vol. 22, No. 26, Dec. 2014, pp. 321119-32137.

Nonejuie et al., "Bacterial cytological profiling rapidly identifies the cellular pathways targeted by antibacterial molecules", PNAS, vol. 110, No. 40, Oct. 1, 2013, pp. 16169-16174.

Rastogi et al., "Holographic optical element based digital holographic interferometer for label-free imaging of *Staphylococcus aureus* bacteria", Proceedings of SPIE, vol. 11188, Nov. 2019, 8 pp.

Robertson et al., "Visible light alters yeast metabolic rhythms by inhibity respiration", Proceedings of the National Academy of Sciences, vol. 110, No. 52, Dec. 2013, pp. 211130-21135.

Schneider et al., "Neural network for blood cell classification in a holographic microscopy system", 2015 17th International Conference, Jul. 2015, 4 pp.

Shao et al., "Machine learning holography for measuring 3D particle distribution", Arxiv.org, Dec. 2019, 14 pp.

Shapiro et al., "Practical Flow Cytometry", John Wiley & Sons, Feb. 2005, 724 pp.

Singh et al., "Lablel-free, high-throughput holographic screening and enumeration of tumor cells in blood", Lap on a Chip, vol. 17, No. 17, 2017, pp. 2920-2932, (Applicant points out, in accordance with MPEP 609.04(a), that the year of publication, 2017, is sufficiently earlier than the effective U.S. filing date, so that the particular month of publication is not an issue.).

Song et al., "Indentification of suitable reference genes for qPCR analysis of serum microRNA in gastric cancer patients", Digestive Diseases and Sciences, vol. 57, No. 4, Apr. 2012, pp. 897-904.

Sun et al., "In-situ DNA hybridization detection with a reflective microfiber grating biosensor", Biosensors and Bioelectronics, vol. 61, Jun. 2014, pp. 541-546.

Sung et al., "Stain-Free Quantification of Chromosomes in Live Cells Using Regularized Tomographic Phase Microscopy", PLOS One, vol. 7, No. 11, Nov. 2012, 7 pp.

Suresh, "Biomechanics and biophysics of cancer cells", Acta Biomaterialia, vol. 3, No. 4, Jul. 2007, pp. 413-438.

Yan et al., "Virtual optofluidic time-stretch quantitative phase imaging", APL Photonics, vol. 5, No. 4, Apr. 2020, 11 pp.

Yao et al., "Distinct Single-Cell Morphological Dynamics under Beta-Lactam Antibiotics", Molecular Cell, vol. 48, Dec. 14, 2012, pp. 705-712.

Zabed et al., "Bioethanol production from fermentable sugar juice", The Scientific World Journal, Mar. 2014, 12 pp.

Zhang et al., "The unreasonable effectiveness of deep features as a perceptual metric", In Proceedings of the IEEE conference on Computer Vision and Pattern Recognition, Jun. 2018, pp. 586-595.

Zhou et al., "ASCII: ASsisted Classification with Ignorance Interchange", arXiv preprint arXiv, Oct. 21, 2020, 12 pp.

Zhuang et al., "Dynamic production and loss of flagellar filaments during the bacterial life cycle", bioRxiv, Sep. 2019, 31 pp.

* cited by examiner

Prediction
518

Test Sample
512

TASK-YOLO
516

ILLUMINATE SAMPLE WITH
COHERENT MULTI-SPECTRAL
BEAM OF LIGHT — 300

CAPTURE HOLOGRAMS FROM
TWO OR MORE BANDS OF THE
MULTI-SPECTRAL LIGHT — 302

EXTRACT FEATURES OF THE
SAMPLE FROM THE
HOLOGRAMS — 304

MULTI-SPECTRAL DIGITAL INLINE HOLOGRAPHY FOR BIOLOGICAL PARTICLE CLASSIFICATION

This application is a national stage entry of International Patent Application No. PCT/US2022/072030, filed Apr. 29, 2022, which claims to and the benefit of U.S. Provisional Patent Application No. 63/201,477, filed Apr. 30, 2021, the entire contents of both applications are incorporated herein by reference.

TECHNICAL FIELD

This disclosure generally relates to imaging and classification of biological particles.

BACKGROUND

Characterization of the biochemical properties of biological particles is essential in research and industrial applications. Representative applications include differentiating cancer cells from normal cells in situ, characterizing the lipid content in biofuel production algae, examining the viability and concentration of yeast in the fermentation industry, and analyzing the viability of bacteria suspended in water and air. State-of-art and commercially available techniques for characterizing biochemical properties of biological particles include cytometer, lab culturing and manual counting, mass spectrometry, and quantitative polymerase chain reaction (qPCR).

Cytometry uses light scattering from a single cell to determine cell properties including viability and genome size. Cytometry, however, suffers from low throughput and requires complex sample preparation, including fluorescent labeling. Fluorescent labeling may impact cell activities, limiting the ability of cytometry to precisely determine viability of some cells.

The lab culturing and manual counting technique usually takes from two days to seven days to culture the cell colonies, which means this technique is not suitable for applications that require fast analysis, such as detecting intrusion of viable biological particles in surgical sites. Similarly, mass spectrometry ionizes the biomolecules (e.g., DNA, RNA, and protein) for identification of bacteria or fungi, while qPCR uses the polymerase chain reaction to amplify target DNA for quantification of gene expression to determine strains and types of biological particles. Both mass spectrometry and qPCR can only be applied to fragmented cells, however, and cannot, therefore, be used to characterize cell viability.

The abovementioned techniques usually require expensive setups (cytometers ~$100,000. qPCR & mass spectrometers>$60,000) and supplies for testing (~~100 per PCR test sample). Such limitations hinder the wider application of these techniques in industry settings.

SUMMARY

In general, the present disclosure describes techniques for high-throughput classification of different types of cells using machine learning and multi-spectral digital inline holographic (DIH) imaging. Cells to be classified are imaged using a digital inline holography technique operating at multiple wavelengths. The holograms acquired at the different wavelengths are then mixed and used to train a neural network to perform cell type classification. In one example approach, the described method has demonstrated a high level of accuracy of cell classification (>90%) for yeast cells and has improved >10% in comparison to methods that use a machine learning network trained by holograms generated via a single wavelength.

Previous approaches to biological particle classification suffer from low throughput and low accuracy of classification, often requiring complex optical setups and long sample preparation. Current techniques rely on sophisticated and expensive optical setups (such as quantitative phase imaging and force spectrum microscopy) to capture information from biological particles for further analysis. But those methods require fine-tuning of the setups and are typically more expensive than the techniques described herein. In addition, those solutions capture only a very limited number of biological particles at the same time, which hinders their throughput. In addition, single-wavelength DIH captures only very limited features of biological particles and is not, therefore, accurate.

As described herein, the present disclosure describes techniques for using multi-spectral DIH to generate images of biological particles for the classification of different types of biological particles. The present disclosure further describes techniques for mixing holograms generated from different wavelengths of illumination for using the mixed holograms to train a convolutional neural network. Such an approach improves cell classification accuracy in comparison to using the single-wavelength holograms. The proposed techniques may have high throughput with improved accuracy and potentially less sample preparation time compared to incumbent methods (e.g., quantitative phase imaging, force spectrum microscopy, and single wavelength DIU).

These techniques classify cell types with high accuracy and high throughput in comparison to the methods described above. They also provide a viable solution for applications requiring fast and accurate detection of different types of particles (e.g., fast cancer detection, surgical site contamination detection, detection of biological contamination in the food and beverage industry, pharmaceutical assembly site, and biotech production line).

In one example, a method for characterizing biological particles includes illuminating a sample with a coherent multi-spectral beam of light, the sample including one or more biological particles; capturing holograms produced by interference of (i) light from the coherent multi-spectral beam of light that was scattered by the sample with (ii) light from the coherent multi-spectral beam of light that was not scattered by the sample, the captured holograms including holograms from two or more spectral bands; and applying a machine learning model to the captured holograms to extract features of the biological particles in the sample from the captured holograms.

In another example, a method of training a neural network includes illuminating a sample with a coherent multi-spectral beam of light, the sample including one or more biological particles; receiving holograms produced by interference of scattered light and unscattered light, wherein the scattered light is light from a coherent multi-spectral beam of light that was scattered by biological particles in a sample and the unscattered light is light from the coherent multi-spectral beam of light that was not scattered by the biological particles in the sample, the received holograms including holograms from two or more spectral bands; and training a convolutional neural network (CNN) to extract features of the one or more biological particles from the holograms.

In another example, a system includes a multi-spectral digital inline holographic (DIH) imaging system, the multi-spectral DIH imaging system including a sample container, a camera and one or more light sources, the one or more light sources configured to generate a coherent multi-spectral beam of light and to direct the coherent multi-spectral beam of light through the sample container, wherein the sample container is configured to receive a sample and wherein the camera is configured to receive the coherent multi-spectral beam of light after the light passes through the sample in the sample container and to capture holograms representative of the sample at two or more spectral bands from the received coherent multi-spectral beam of light; and a computing system connected to the multi-spectral DIH imaging system, wherein the computing system includes instructions that, when executed by the computing system, cause the computing system to receive the holograms from the multi-spectral DIH imaging system and to apply a convolutional neural network (CNN) to the holograms to extract features of the biological particles in the sample from the holograms.

Details of one or more examples of the techniques of this disclosure are set forth in the accompanying drawings and the description below.

BRIEF DESCRIPTION OF DRAWINGS

FIG. 7A illustrates the performance of classifying different viability levels as quantified as confusion matrices using the CNN architecture trained only on holograms of two yeast strains in the Dead group from the red laser, only on holograms of two yeast strains in the Dead group from the green laser, only on holograms of two yeast strains in the Dead group from the blue laser, and with holograms of two yeast strains in the Dead group from each laser, in accordance with one aspect of the disclosure.

FIG. 7B illustrates the performance of classifying different viability levels as quantified as confusion matrices using the CNN architecture trained only on holograms of two yeast strains in the Live group from the red laser, only on holograms of two yeast strains in the Live group from the green laser, only on holograms of two yeast strains in the Live group from the blue laser, and with holograms of two yeast strains in the Live group from each laser, in accordance with one aspect of the disclosure.

Like reference characters refer to like elements throughout the figures and description.

DETAILED DESCRIPTION

Figure 1A:
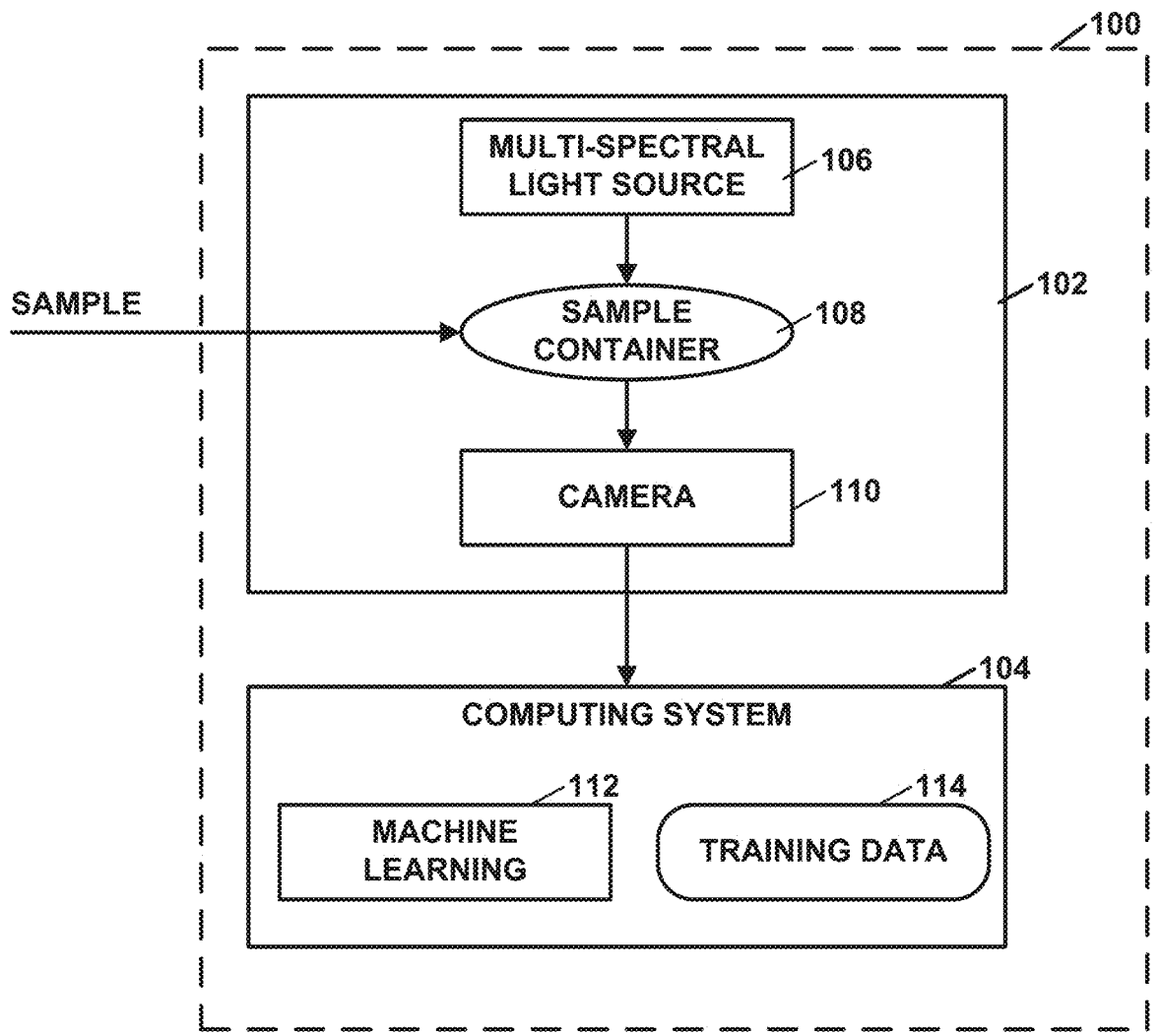
FIG. 1A is a block diagram illustrating an example multi-spectral digital inline holography (DIH) system, in accordance with one or more techniques of this disclosure.

One approach to characterizing the biochemical properties of biological particles without a complex and time-consuming sample preparation approach (i.e., lab culturing and fluorescent labeling) is to observe changes in the optical properties of biological particles. Changes in bio-chemical properties are strongly correlated with changes in optical properties. For instance, with increasing protein molecules concentrations in cytochylema under rapid cell division and proliferation, the refractive index of cytochylema increases. In addition, researchers have found that the change of refractive index of cytochylema may also reflect a change in the concentration of lipids, carbohydrates, and DNA in the cytochylema. Such changes in refractive index, detectable through optical-based measurements, may be used to characterize the change of biochemical composition of biological particles.

Researchers have also found that the refractive index of cancer cells is higher than that of normal cells by mapping the phase change of both living normal cell (RK3E) and cancer cell (RK3E-ras) using quantitative phase imaging (QPI). QPI requires complex optical setup, however, and suffers with low throughput. As such, QPI is not suitable for an industrial scale application that requires high throughput (at least 50 liters/hour) analysis of liquid samples (such as yeast cell characterizations in the food and beverage industries).

Time stretch quantitative phase imaging (TS-QPI) may be used to solve the low throughput issue. TS-QPI uses optical path difference, absorption and scattering to accurately characterize biological particles. Broad application of TS-QPI is, however, limited by the high cost of the instrument (>$10,000) and the large amount of data required for the analysis.

Digital inline holographic (DIH) imaging system is a low-cost alternative to QPI. DIH captures the optical property change of biological particles with different biochemical characteristics. Typically, DIH uses a low-cost imaging sensor with continuous laser or LED illumination without any complex optical setup which substantially lower the cost of the measurement system. A portable lens-free holography system has been used to analyze the concentration and viability of yeast cells via a support vector machine (SVM). But such a system is unable to analyze detailed biochemical information such as metabolic state due to the limited number of features that can be extracted by the SVM.

Finally, single wavelength digital inline holography has been used to classify normal cells and cancer cells. The approach was only capable, however, of extracting three features (diameter, maximum intensity, and mean intensity) and of using the three features to build classifiers. The limited number of features leads to non-ideal performance on test sets. For instance, the approach achieves only 80% accuracy when differentiating MCF7 cells spiked in diluted whole blood.

Instead, a high throughput multi-spectral DIH system may be used to capture the spectral responses of biological particles under multiple-wavelength illumination. Such a system employs a simple optical setup with high accuracy and high throughput, capable of capturing different spectral responses of biological particles under multiple wavelength illumination. In one such example approach, a specially designed convolutional neural network (CNN) is used to integrate the information obtained from the different spectral-specific responses. Such a methodology may be used to improve the specificity of the analysis of biological particles, allowing the user to identify fine changes in the biochemical composition of biological particles under different metabolic states and different activities using a simple and low-cost DIH setup.

In one example, a multi-spectral DIH system may be used for in situ biochemical properties (e.g., viability, metabolic rate, species, etc.) analysis of biological particles (e.g., bacteria, fungi, spores, virus, pollen, etc.) The system may feature high throughput (>10,000 particles per second) characterization of biological particles, and cost-effective (<$10,000) instruments without need for subsequent reagents. A chromatic camera may be used to simultaneously record different spectral responses originated from the biochemical composition of biological particles.

In one example approach, a machine learning algorithm based on the YOLOv5 architecture provides real time analysis of biological particles. Specifically, a customized eight-layer CNN combined with the skip connection and the Mish activation function is utilized to replace the original YOLO backbone network. The Mish activation function may be defined as $f(x)=x \cdot \tanh(\varsigma(x))$, where $\varsigma(x)=\ln(1+ex)$.

A more advanced pooling method is implemented to upgrade the original pooling method for better local feature utilization and combination. In addition, a circular bounding box is utilized in the detection for higher detection precision, replacing the traditional rectangular bounding box. The example further includes a more robust method for generating a training set and the learning rate schedule is redesigned for hologram types of images.

A three spectral version of the DIH system has been applied in the classifying of two strains of yeast cells (*Saccharomyces cerevisiae* and *Saccharomyces pastorianus*) at four different metabolic states. That system achieved 96% overall classification accuracy in determining the metabolic state, approximately 10% higher than the best single wavelength DIH, demonstrating improved specificity for biological particle characterization. Such a system also achieved 98% accuracy when distinguishing dead cells from live cells. Tests based on prostate cancer cells and white blood cells have shown that a three spectral system exhibits good transferability and can be extended to achieve label-free characterization of biological particles in many other applications including detecting circulating tumor cells, monitoring lipid content of biofuel-producing algae, and determining the viability of bioaerosols suspended in air.

FIG. 1A is a block diagram illustrating an example multi-spectral digital inline holography system, in accordance with one or more techniques of this disclosure. As noted above, characterization of the biochemical properties of biological particles is essential in many fundamental research and industrial applications, including when differentiating cancer cells from normal cells, characterizing the lipid content in biofuel production algae, examining yeast viability and concentration in the fermentation industry, and analyzing viability of bacteria suspended in water and air. In the example shown in FIG. 1A, multi-spectral digital inline holography system 100 performs such characterization via machine learning and multi-spectral DIH imaging.

In some examples, multi-spectral DIH system 100 may be or form part of various types of devices and systems, such as a computing device, a real-time in-situ cell classifier, a system for 3-dimensional (3D) flow diagnostic flow analysis, a holographic microscope, a holographic characterization device, and other types of devices or systems. Example applications of the techniques of this disclosure may include cell imaging, cell classification, 3D flow diagnostics, microscopic particle tracking, and environmental monitoring.

In the example of FIG. 1A, multi-spectral DIH system 100 includes a holographic imaging apparatus 102 and a computing system 104. In other examples, multi-spectral DIH system 100 may include more, fewer, or different components. In some examples, components of multi-spectral DIH system 100 may be implemented as one or more devices. In some such examples, components of multi-spectral DIH system 100 may be geographically dispersed. In other examples, components of multi-spectral DIH system 100 may be integrated into a single device or set of devices.

In one example approach, holographic imaging apparatus 102 includes multi-spectral DIH imaging technology for fast analysis of biological particles, including their biochemical properties. As shown in FIG. 1A, holographic imaging apparatus 102 includes a multi-spectral light source 106, an inline sample container 108 and a camera 110. In one such approach, multi-spectral light source 106 is used to illuminate a sample stored in sample container 108. Holograms produced by the interference of the scattered light from the sample and non-scattered portions of the collimating beam are captured by camera 110 and transferred to a computing system 104 for processing. In one example approach, camera 110 acquires multi-spectral holograms of biological particles, and a machine-learning based data analysis executing in computing system 104 processes the holograms to obtain desired information on the sample.

In one example approach, computing system 104 includes machine learning system 112 and training data storage 114. In one such example approach, computing system 104 analyzes the multi-spectral holograms from the camera 110. For each biological particle captured by DIH camera 110, computing system 104 may simultaneously conduct the localization, classification, and biochemical analysis through a real time machine-learning-based analysis model, e.g., developed on the foundation of classic You-Only-Look-Once (YOLO) architecture. The original YOLO architecture, as described by Joseph Redmon, Santosh Divvala, Ross Girshick, Ali Farhadi in the paper You Only Look Once: Unified, Real-Time Object Detection, May 2016, DOI: https://arxiv.org/pdf/1506.02640.pdf and Xu, Renjie & Lin, Haifeng & Lu, Kangjie & Cao, Lin & Liu, Yunfei. (2021). A Forest Fire Detection System Based on Ensemble Learning. Forests. 12. 217. 10.3390/f12020217, includes three parts, including the backbone (a convolutional neural network that extracts features from the image), the neck (multiple layers that combine the extracted features and pass to the prediction step), and the head (the prediction layer utilizing the combined feature and predict the location and class of the target).

Figure 1B:
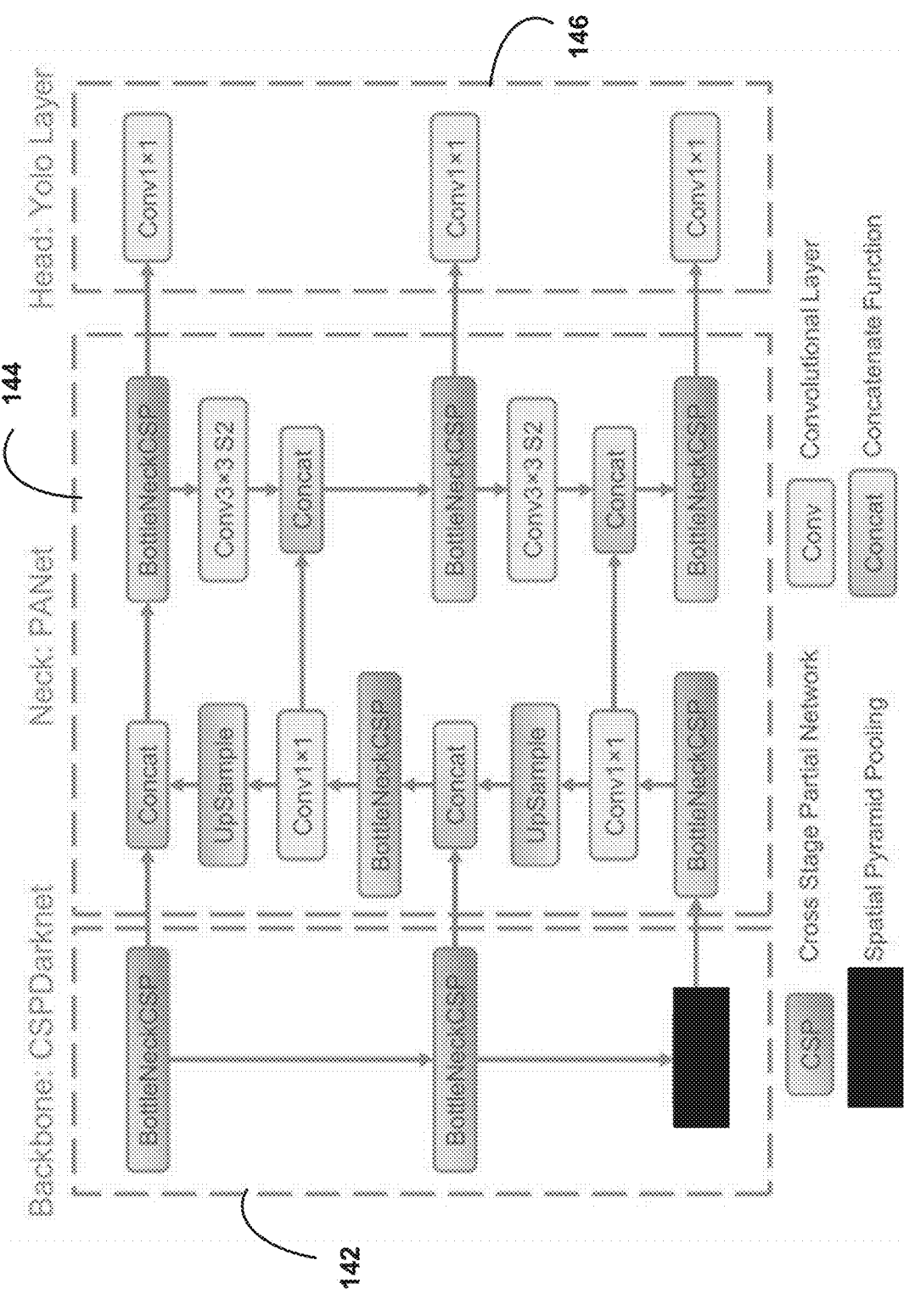
FIG. 1B is a block diagram illustrating an example You-Only-Look-Once (YOLO) network architecture used in the multi-spectral DIH system of FIG. 1A, in accordance with one or more techniques of this disclosure.

FIG. 1B is a block diagram illustrating an example You-Only-Look-Once (YOLO) network architecture used in the multi-spectral DIH system of FIG. 1A, in accordance with one or more techniques of this disclosure. In the example approach of FIG. 1B, the network architecture is based on YOLOv5. In the example of FIG. 1B, the YOLO network architecture 140 includes three parts: Backbone 142, Neck 144, and Head 146. In one example approach, data is first input to CSPDarknet for feature extraction, and then fed to PANet for feature fusion. Finally, the Yolo Layer outputs detection results (class, score, location, size).

In one example approach, each YOLO part is specially designed based on the specific features of biological particles in holograms to yield optimal performance for the desired applications. In one such example approach, a customized eight-layer convolutional neural network combined with a skip connection and a Mish activation function may be used to replace the original network in the backbone part which may substantially increase the ability of the model to extract subtle features from the holograms of the biological particles. The last four layers of the backbone network may be transferred to the next stage for the feature combination to increase the amount of information obtained from the backbone part.

In the example approach shown in FIG. 1B, the original spatial pyramid pooling method (SPP) used in the neck part has been upgraded to a more advanced method. In the example shown in FIG. 1B, the original SPP has been replaced with cascaded hierarchical atrous spatial pyramid pooling (CHASPP), which helps utilize more extracted local features compared with the original method. Furthermore, in some example approaches, the traditional rectangular bounding box used in the detection step is replaced by a circular bounding box for the cell localization and classification, which can match the cell shapes more precisely, thus improve the accuracy of the intersection-over-Union (IoU) calculation.

Figure 2:
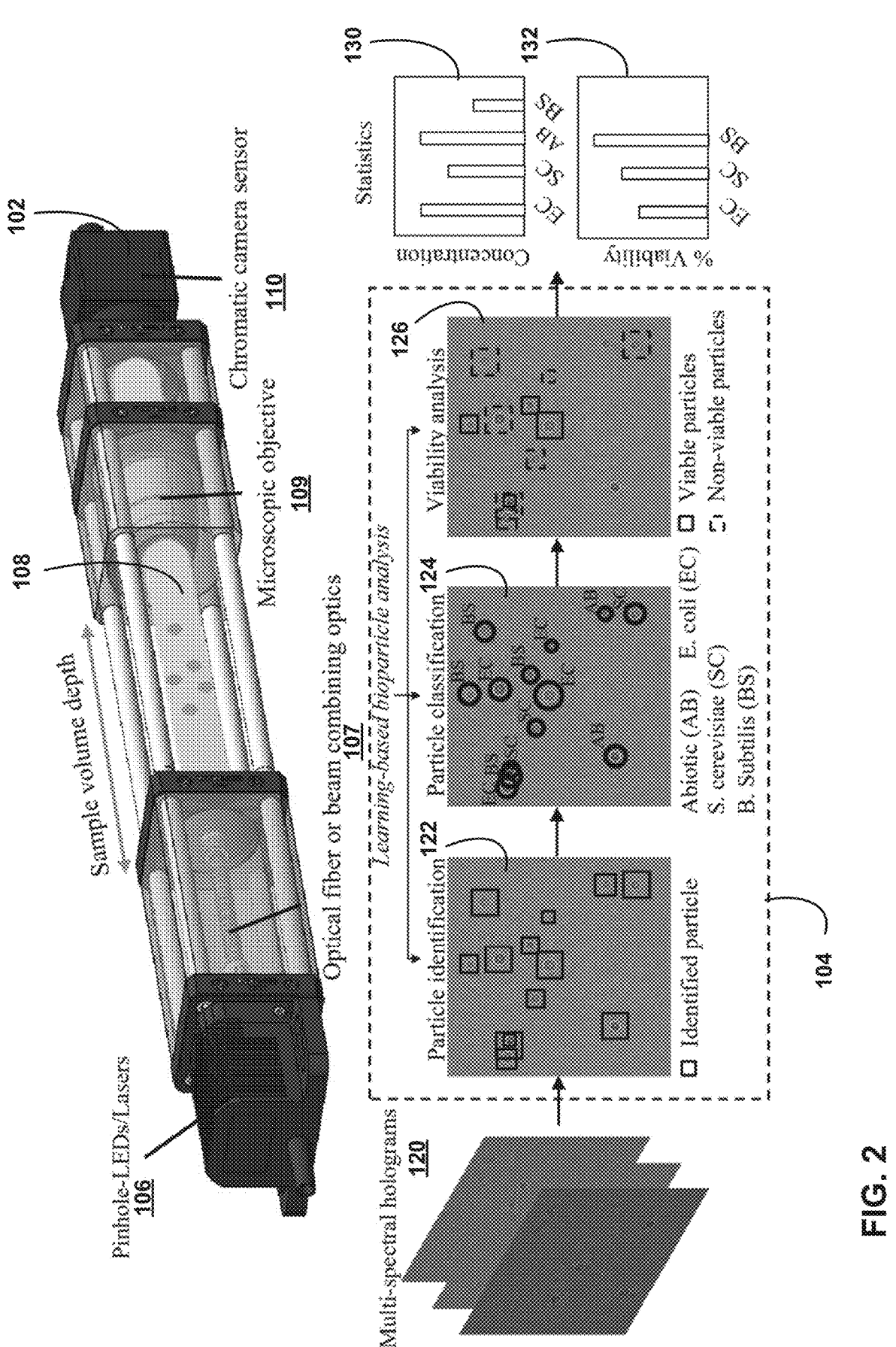
FIG. 2 illustrates a more detailed example of the multi-spectral DIH system of FIG. 1A, in accordance with one or more techniques of this disclosure.

FIG. 2 illustrates a more detailed example of the multi-spectral DIH system of FIG. 1, in accordance with one or more techniques of this disclosure. In the example shown, multi-spectral light source 106 uses lasers/pinhole-LEDs as the light source 106. In one such example, holographic imaging apparatus 102 directs coherent light generated by multi-spectral light source 106 into an optical fiber 107 or other beam combining optics to increase spatial coherence of the coherent light (which may be required to generate holograms). Holographic imaging apparatus 102 may then collimate the coherent light into a parallel beam to illuminate the samples in sample container 108 after the coherent light is emitted from optical fiber 107. As shown in FIG. 2, holograms 120 produced by the interference of the scattered light from the sample and non-scattered portion of the collimating beam may be captured by a microscopic objective 109 mounted in front of a camera 110. In the example approach shown, camera 110 includes a large-format chromatic sensor, such as a large-format complementary metal-oxide-semiconductor (CMOS) sensor.

In some example approaches, magnification may be chosen to ensure high throughput (i.e., large field of view of the holograms) and enough resolving power to distinguish particles. Multi-spectral (e.g., red, green, and blue) holograms may be obtained from the pixels corresponding to the red, green, and blue channels (separated using the Bayer filters) of the chromatic sensor. In one example approach, camera 110 is designed to resolve targeted biological particles having a size above 0.2 μm. In one example approach, the optical components are mounted on a cage system to ensure their alignment and can be shielded by an enclosure to prevent contamination in the operating environment. The inline compact design of camera 110 may allow camera 110 to be integrated with existing systems, such as pipes in production lines in the fermentation industry or other industries.

FIG. 2 also illustrates steps of biological particle classification using holograms 120 captured by holographic imaging apparatus 102. In the example shown in FIG. 2, computing system 104 analyzes the holograms 220 from the DIH sensor 110 using the hologram processing software shown in the lower half of FIG. 2. For each biological particle captured by DIH sensor, computing system 104 computes localization 122, classification 124, and biochemical analysis 126 (e.g., viability) simultaneously through an in-house real time machine-learning-based analysis model developed on the foundation of classic YOLOv5. The analysis may be retrieved by a user as annotated holograms or in the form of statistics such as concentration 130 and viability 132.

As noted above, the classic YOLO architecture consists of three parts, including the backbone (a convolutional neural network that extracts features from the image), the neck (multiple layers that combine the extracted features and pass to the prediction step), and the head (the prediction layer utilizing the combined feature and predict the location and class of the target). In the multi-spectral DIH system 100 of FIG. 2, each YOLO part is designed based on the specific features of biological particles in holograms to yield optimal performance for the desired applications. Specifically, a customized eight-layer convolutional neural network combined with the skip connection and the Mish activation function is used to replace the original network in the backbone part, which substantially increases the ability of the model to extract subtle features from the holograms of the biological cells. The last four layers of the backbone network will be transferred to the next stage for the feature combination to increase the amount of information getting from the backbone part.

In addition, the original spatial pyramid pooling method (SPP) used in the neck part is upgraded to a more advanced method, i.e., cascaded hierarchical atrous spatial pyramid pooling (CHASPP), which helps utilize more extracted local features compared with the original method. Furthermore, the traditional rectangular bounding box used in the detection step is replaced by a circular bounding box for the localization and classification of biological particles, which can match their shapes more precisely, thus improve the accuracy of the Intersection-over-Union (IoU) calculation.

In addition, in one example machine learning training approach, instead of directly using holograms obtained from experiments to train system 100, biological particles captured by the hologram are first segmented using a pretrained generic machine learning detection model to form a database with single-particle holograms with labels of the specific type. Randomly selected multiple single-particle holograms from the database are combined to synthetically generate the training set for a new model which can classify different types of biological particles. By using this approach, the density, and types of the biological particles in the training set can be manually determined, thus increase the variability of the training set, which can potentially increase the accuracy and the robustness of the model.

Finally, a new learning rate schedule designed for the hologram type images is used to replace the original schedule which can potentially increase the speed and stability of the training process. More specifically, the initial learning rate of the optimizer and the decay rate of the learning rate are customized for holograms specifically, which determines how fast the model weights update (see, e.g., Kingma, D. P., & Ba. J, (2014). Adam: A method for stochastic optimization. arXiv preprint arXiv: 1412.6980). In addition, holograms in the validation set were used to evaluate the model performance which was used to monitor the training process and to terminate the training if the threshold is reached. As such, the model trained for biological particle analysis in this disclosure distinguishes subtle differences of biological particles under different metabolic states while retaining the robustness of the models on analyzing different datasets. Examples of such hologram processing algorithms have been developed using Python and PyTorch.

Computing system 104 may perform machine learning holography for 3D particle field reconstruction using a convolutional neural network with components aiming to cope with challenges arising in particle holograms where accurate measurement of individual particles is a significant consideration. The techniques of this disclosure may be able to process very high-density particle field holograms with significantly speed improvement. Furthermore, the techniques of this disclosure may be adapted to other types of particle field imaging, particularly for 3D measurements. In one example approach, machine learning system 112 includes a U-net convolutional neural network (CNN) that generates data based on holograms generated by holographic imaging apparatus 102.

In one example approach, computing system 104 uses training data 114 to train U-net CNN of machine learning system 112. Training data 114 may include training data examples. Each training data example may include a set of input data and a corresponding set of output data. The input data of a training data example may include the types of input data discussed herein. The output data of a training data example may include the types of output data discussed herein.

Figure 3A:
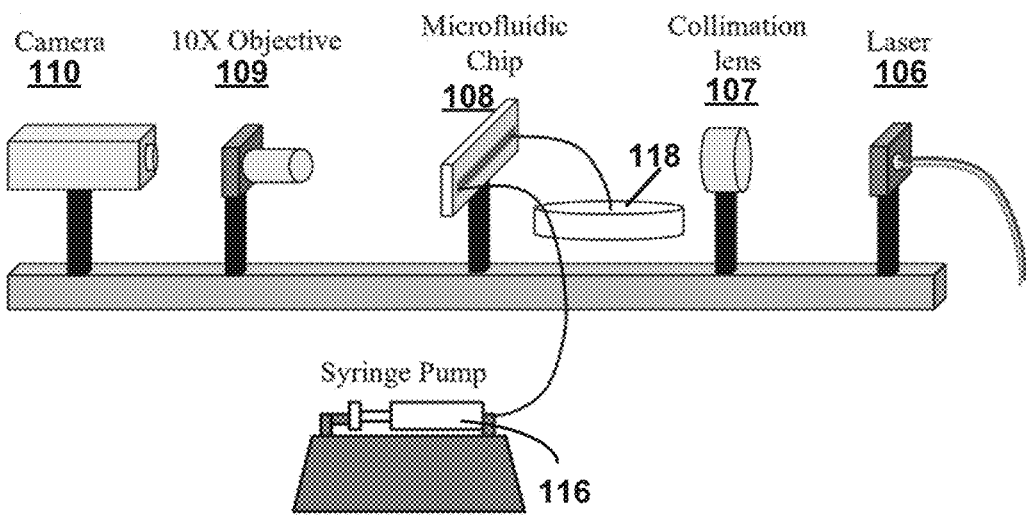
FIGS. 3A and 3B illustrate an experimental setup of the holographic imaging apparatus of FIGS. 1A and 2, in accordance with one or more techniques of this disclosure.
Figure 3B:
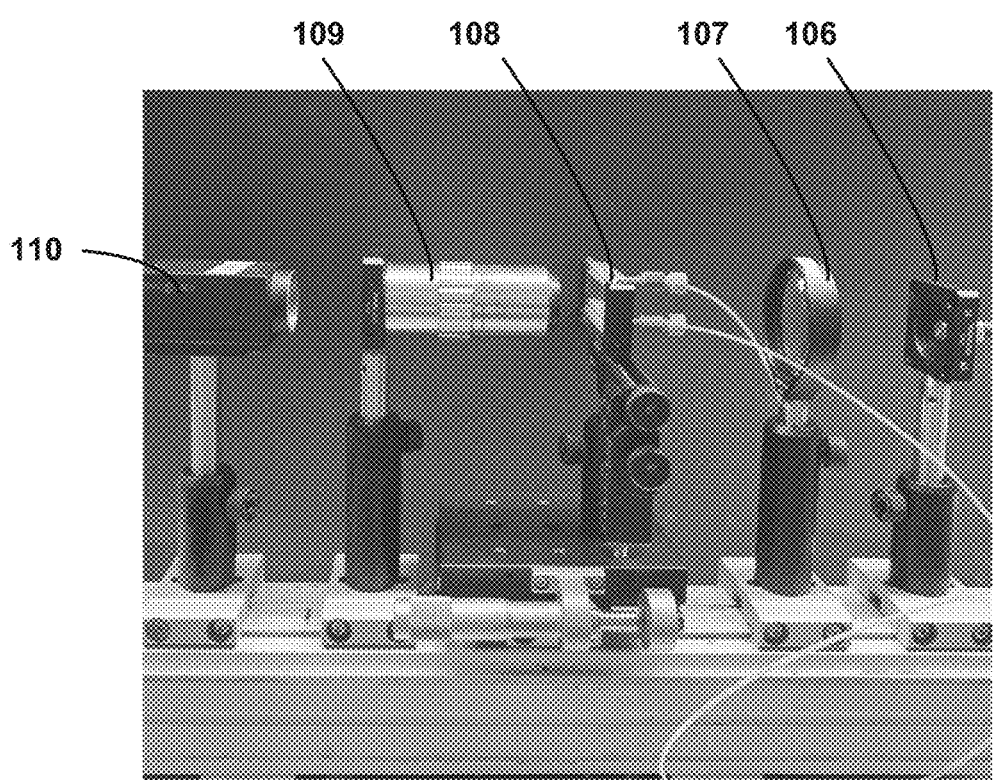

FIGS. 3A and 3B illustrate an experimental setup of the holographic imaging apparatus of FIGS. 1 and 2, in accordance with one or more techniques of this disclosure. In the example apparatus 102 of FIGS. 3A and 3B, multi-spectral light source 106 includes fiber lasers having three wavelengths (659 nm, 522 nm, 454 nm) (Agiltron Inc.). In one example approach, the fiber lasers are used for simultaneous illumination of sample container 108.

In the example shown in FIGS. 3A and 3B, beam combining optics 107 includes a collimation lens with 60 mm focal length (Thorlabs Inc.) that is used to generate a collimated beam. Collectively, these optical components yield a 20 mm diameter collimated laser beam.

Sample container 108 (which may be a microfluidic chip) includes a microfluidic channel. Sample container 108 may fabricated from acrylic. The microfluidic channel may have a 1 mm width and may be used to transport biological particles such as yeast cells at a desired flow rate (0.005 mL/min) from a sample source 118 via syringe pump 116, yielding high throughput and avoiding double analysis of the same cell.

In the example shown in FIGS. 3A and 3B, the holograms are magnified by a 10× objective 109 (EO M Plan, NA 0.45) and recorded by camera 110 (which may be a CMOS camera, such as a FLIR Oryx CMOS camera). The system may be calibrated by imaging a precision micro ruler (e.g., from Thorlabs Inc.) to obtain a spatial resolution of 0.56 μm/pixel. All instruments may be mounted on an optical rail system (e.g., from Thorlabs Inc.).

The setup of FIGS. 3A and 3B may be used to classify yeast cells during fermentation processes. Two types of yeast cells were used: *Saccharomyces cerevisiae* and *Saccharomyces pastorianus*. *S. cerevisiae* is the common yeast used to produce ale beer with a preference of fermentation temperature between 17-22° C., which will be referred to as ale yeast, whereas *S. pastorianus* is a bottom fermentation yeast used to produce lager beer under lower fermentation temperature (~10° C.), referred to as lager yeast. Both yeast cells were cultured separately in sterile YPD media (e.g., from Sigma Aldrich) overnight at 30° C. for 16 hours. Overnight cultures were centrifuged to remove the liquid and were diluted into fresh YPD. The diluted culture was divided into 20 milliliters samples which were tested at 0, 1-h, 3-h time points representing different metabolic states during fermentation, where 0 indicates the start of fermentation.

Figure 4:
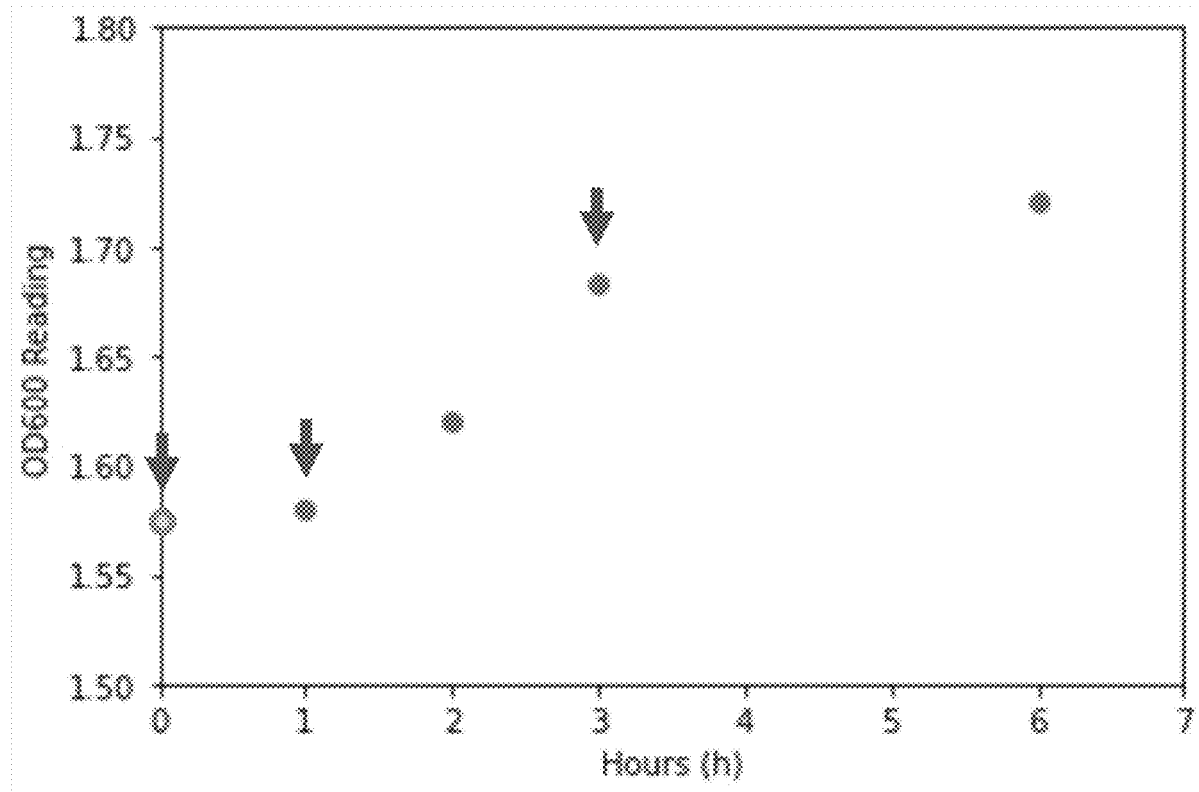
FIG. 4 is a growth curve of growth of yeast during fermentation at room temperature.

FIG. 4 is a growth curve of growth of yeast during fermentation at room temperature. During the fermentation process, the change in metabolic status of yeast cells accompany the physiological changes such as the biochemical contents (e.g., glycogen, neutral lipid, trehalose, proteins). Such changes in turn alter the diffraction patterns of the cell holograms, yielding different responses with different wavelengths which can be captured by the multi-spectral DIH system 100 shown in FIGS. 3A and 3B.

In one example approach, metabolic state was confirmed from the cell growth curve of FIG. 4 by measuring the optical density at wavelength 600 nm (OD600 reading). Three metabolic states during fermentation are indicated by arrows in FIG. 4. A fourth metabolic state was taken by measuring the optical density of the dead group of yeast cells.

As shown in the growth curve of the ale yeast (FIG. 4), the 1-h time point is near the end of the lag phase when cells are adapting to their new environment and preparing for division (e.g., DNA duplication) but no cell division has yet started. The 3-h time point is during the log phase when cells start to divide, and the cell number rapidly increases. At the time 0, an extra 20 milliliter sample was collected and heated at 80° C. to kill the yeast. A total of eight conditions were tested (2 strains×4 metabolic states).

Figure 5A:
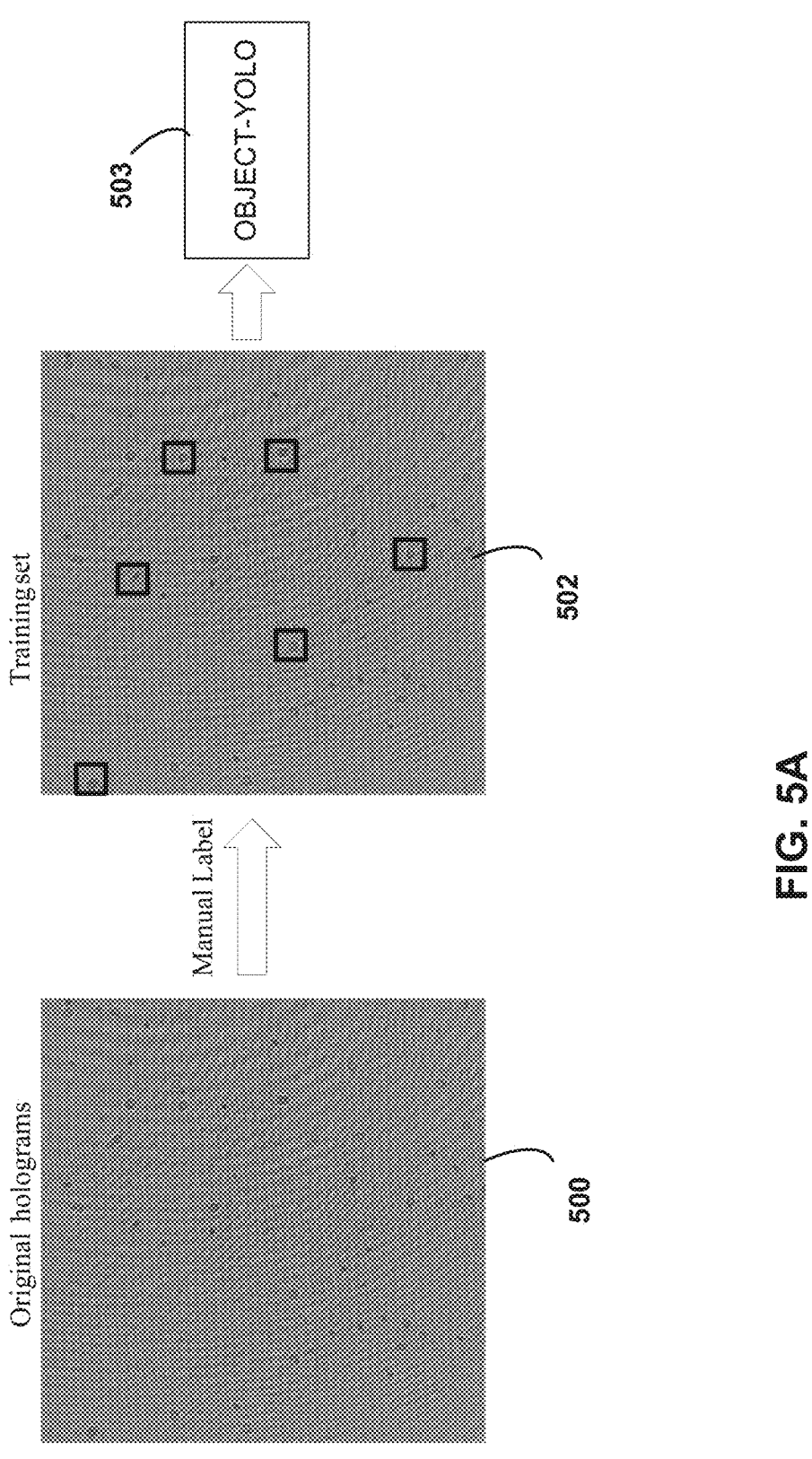
FIGS. 5A and 5B illustrate methods of training a YOLO model to detect and classify biological particles, in accordance with aspects of the disclosure.
Figure 5B:
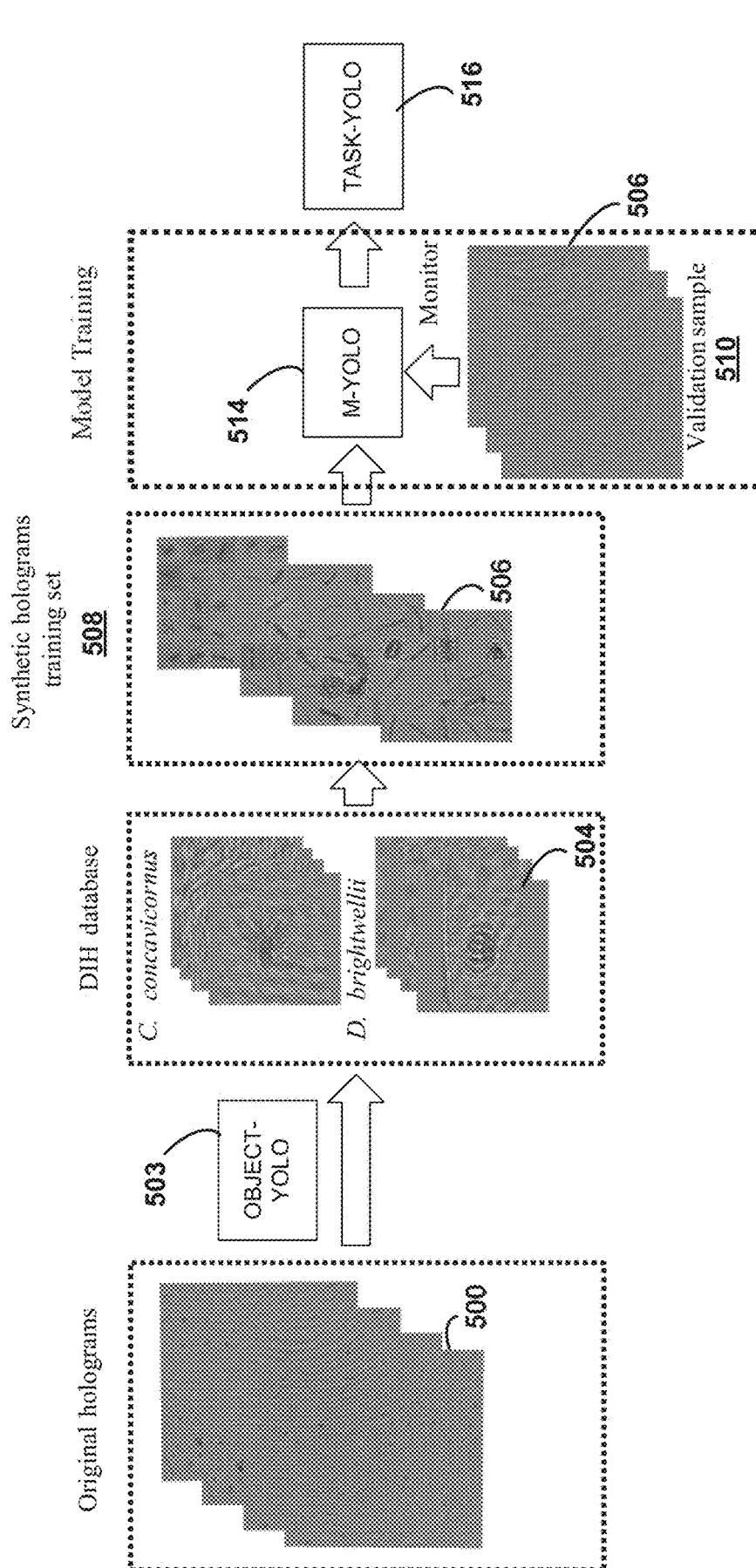
Figure 5C:
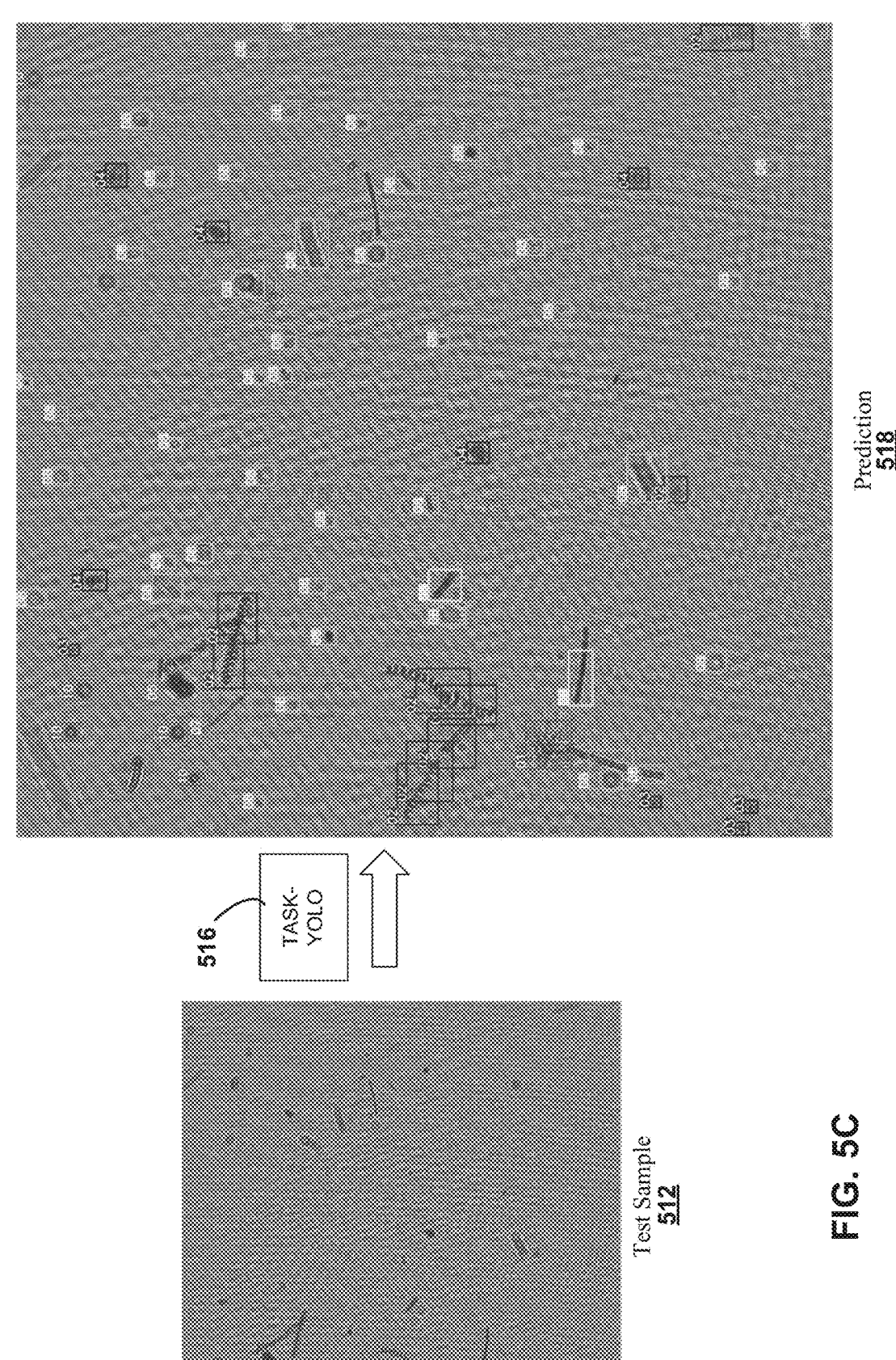
FIG. 5C illustrates a method of particle identification using the YOLO models of FIGS. 5A and 5B, in accordance with an aspect of the disclosure.

FIGS. 5A and 5B illustrate methods of training a YOLO model to detect and classify biological particles, in accordance with aspects of the disclosure. FIG. 5C illustrates a method of particle identification using the YOLO models of FIGS. 5A and 5B, in accordance with an aspect of the disclosure.

In the example shown in FIG. 5A, biological particles captured by hologram 500 are labeled by an expert to form training set 502. Training set 502 is then used to train a standard YOLO detection model 503 to detect biological particles in holograms generated by multi-spectral DIH system 100. In one such example approach, ten holograms 500 are randomly selected from each condition and strain. The total of 80 holograms 500 are then used to train a generic YOLO detection model 503, which automatically detects and segments individual yeast cells by predicting the location and size.

The example shown in FIG. 5B illustrates an example training process for the new YOLO model for particle classification. In the example shown in FIG. 5B, biological particles captured by holograms 500 for each type (e.g., strain) and state of biological particle are first segmented using the standard YOLO detection model. A 128 pixel×128 pixel region centered at each detected cell is cropped to generate a single-cell hologram 504 with the label of a specific condition (strain and metabolic state). The single-cell holograms 504 are used to form a database of single-particle holograms 504, all labeled by type and state.

In one example approach, one hundred synthetic holograms 506 are generated by placing randomly selected single cell holograms 504 on a background canvas. The synthetic holograms 506 form a new dataset which is then divided into training set 508 (70%), validation set 510 (20%) and a test set 512 (shown in FIG. 5C) (10%). The synthetic holograms of training set 508 are then used to train a new TASK-YOLO model 516 to classify different types of biological particles (strain and metabolic rate) via the training procedure M-YOLO 514.

In the example approach of FIG. 5C, the trained TASK-YOLO 516 may then be used to detect biological particles in test sample 512 (or in other samples). The output is a prediction 518 showing labeled biological particles as shown in FIG. 5C.

Figure 6:
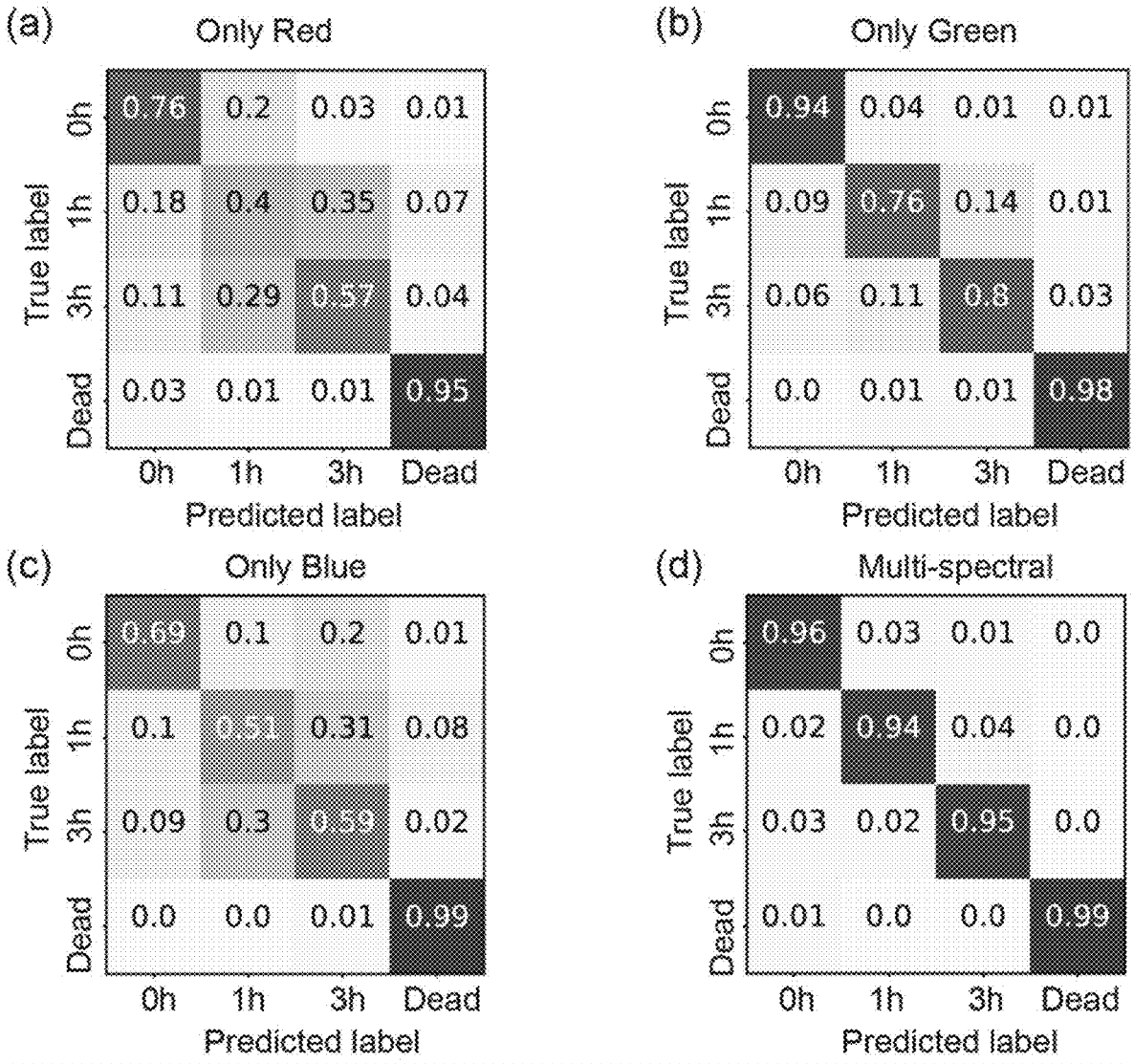
FIGS. 6A-6D illustrate the performance of classifying different metabolic states as quantified as confusion matrices using the CNN architecture trained (a) only on holograms from the red laser. (b) only on holograms from the green laser. (c) only on holograms from the blue laser, and (d) with holograms from each laser, in accordance with one aspect of the disclosure.

FIGS. 6A-6D illustrate the performance of classifying different metabolic states as quantified as confusion matrices using a CNN architecture trained (a) only on holograms from the red laser, (b) only on holograms from the green laser, (c) only on holograms from the blue laser, and (d) with holograms from each laser, in accordance with one aspect of the disclosure. To demonstrate the capability of improving cell analysis accuracy by using multi-spectral approach, four experiments (i.e., trained on holograms from single split channel of red laser, green laser, and blue laser, and trained on multi-spectral holograms) are conducted. The machine learning model trained from red laser holograms has an analysis accuracy of 65% (FIG. 6A), from green laser holograms has a classification accuracy of 87% (FIG. 6B), and from blue laser holograms has an accuracy of 71% (FIG. 6C). Among yeast cell at four different metabolic states, 1 h and 3 h are less distinguishable groups compared to the 0 h and dead groups. When using multi-channel holograms to train the model, the machine learning system 112 may achieve an overall accuracy improvement of ~10%, reaching 96%. Additionally, the group of yeast cells at lag phase (1 h) have a substantial increase of analysis accuracy by about 18%. Therefore, the multi-spectral approach (FIG. 6D) combined with the machine learning architecture substantially improves cell classification accuracy especially for the cases with subtle differences by adding more information through multi-wavelength illuminations. Furthermore, the processing speed for the 3K-by-3K image is 12.5 frame per second (FPS) when using a NVIDIA Tesla V100 graphic card.

Figures 7A, 7B:
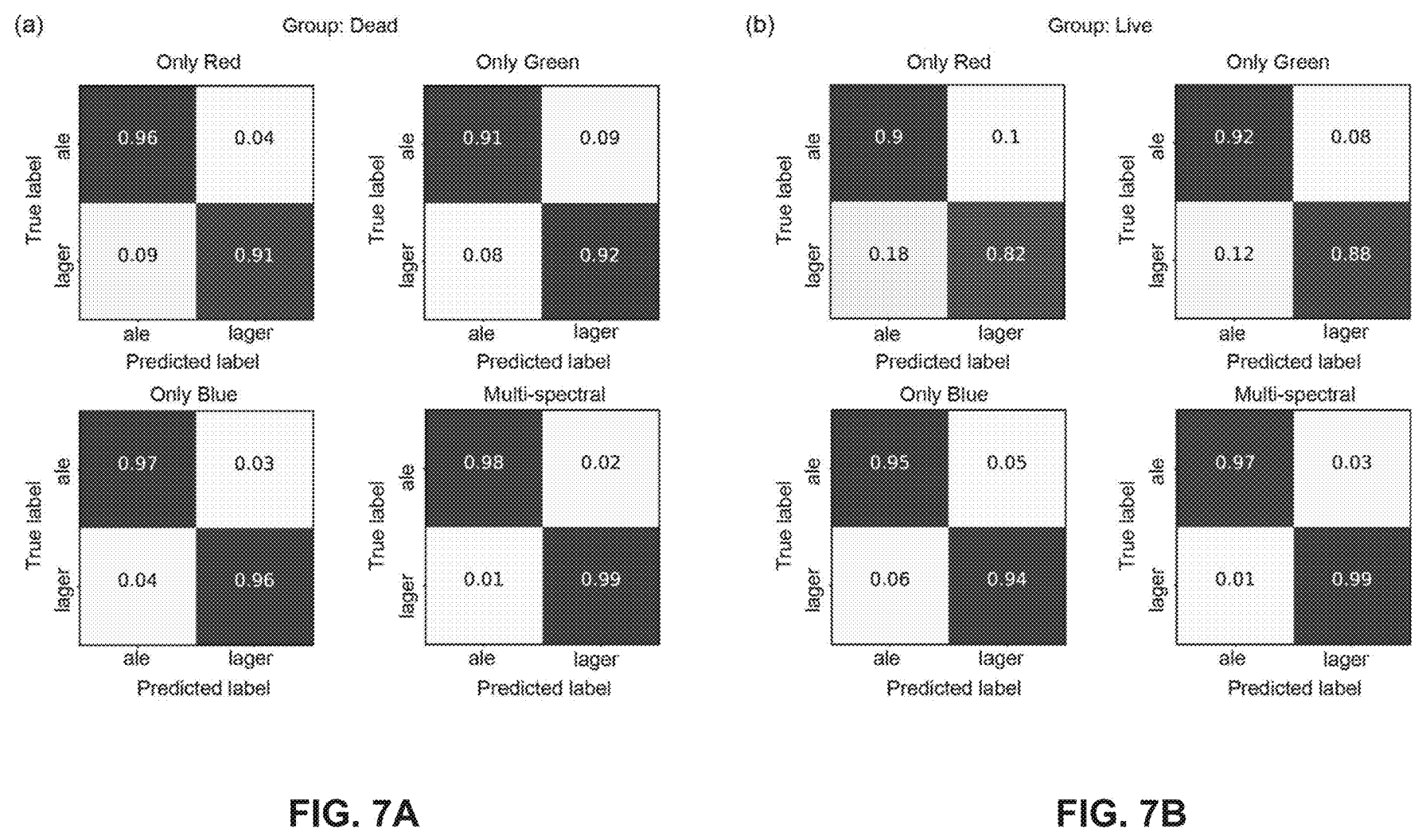

FIG. 7A illustrates the performance of classifying different viability levels as quantified as confusion matrices using the CNN architecture trained (a) only on holograms of two yeast strains in the Dead group from the red laser, (b) only on holograms of two yeast strains in the Dead group from the green laser, (c) only on holograms of two yeast strains in the Dead group from the blue laser, and (d) with holograms of two yeast strains in the Dead group from each laser, in accordance with one aspect of the disclosure. This experiment aims to demonstrate the ability of our approach to differentiate biological particles that are morphologically similar but have different biochemical compositions that lead to different holographic signatures. When applied to dead yeasts, the machine learning model trained from red laser holograms has an accuracy of 93% in classifying ale and larger yeasts. This accuracy changes to 91% for green spectral holograms and 96% for blue spectral holograms. When using multi-channel holograms to train the model, the machine learning can achieve an overall accuracy of 98%, highest among all the test cases.

FIG. 7B illustrates the performance of classifying different viability levels as quantified as confusion matrices using the CNN architecture trained (a) only on holograms of two yeast strains in the Live group from the red laser, (b) only on holograms of two yeast strains in the Live group from the green laser, (c) only on holograms of two yeast strains in the Live group from the blue laser, and (d) with holograms of two yeast strains in the Live group from each laser, in accordance with one aspect of the disclosure. When applied to live yeast cases, the accuracy changes to 86% for red, 90% for green, 94% for blue, and still retains the highest of 98% for multi-spectral holograms. Although in this case the single-spectral DIH has already shown high accuracy of classifying cells of different strains (though slightly less than multi-spectral DIH), the dependence of analysis accuracy on specific spectral information is evident (e.g., 86% for red bs 94% for blue and blue holograms consistently showing the highest accuracy for both live and dead cases). This trend indirectly demonstrates the value of multi-spectral DIH for probing cells of different biochemical compositions.

Finally, to further illustrate the transferability of the proposed machine learning method, another experiment was conducted using the pretrained yeast cell detection model and additional datasets of prostate cancer cells (PC3) and white blood cells (WBCs) to train a new model that may be used for the classification of six types of cells. The new model not only retains accuracy above 90% for four types of yeast cells, but also achieves a 91% accuracy for WBC, and 93% for PC3, demonstrating the ability of transfer learning. As for the training time, to achieve the same level of accuracy, using transfer learning approach, the training time is reduced by 50% in comparison with training the model from scratch. Such reduction in the training time can be more significant when the number of cell type increases.

Figure 8:
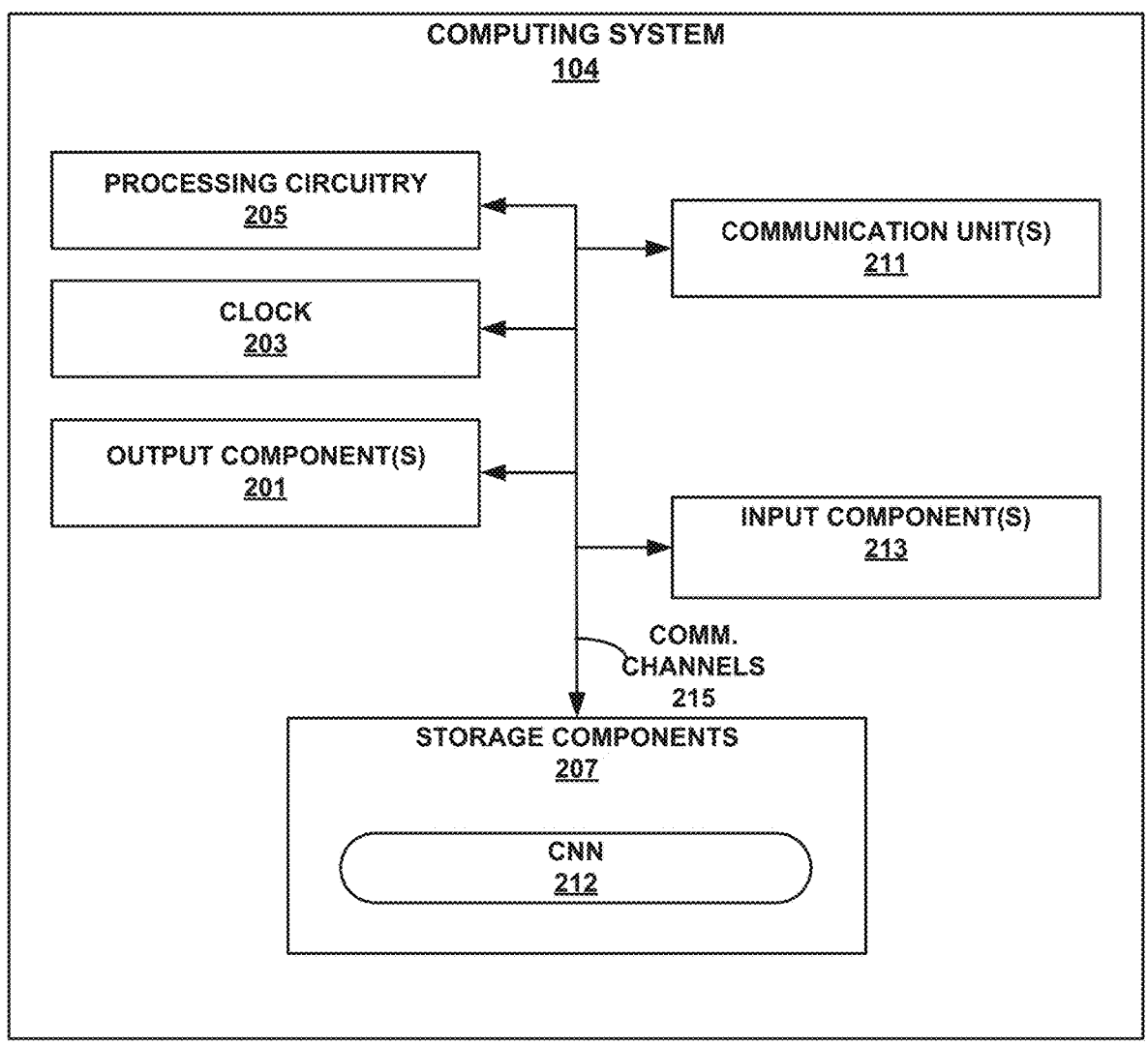
FIG. 8 is a block diagram illustrating an example computing system within one of the example architectures of FIGS. 1A and 2, in accordance with one or more techniques of the disclosure.

FIG. 8 is a block diagram illustrating an example computing system within one of the example architectures of FIGS. 1A and 2, in accordance with one or more techniques of the disclosure. Computing system 104 of FIG. 8 processes holograms of a sample taken in accordance with techniques of this disclosure. FIG. 8 illustrates only one example of computing system 104, and many other examples of computing system 104 may be used in other instances and may include a subset of the components included in example computing system 104 or may include additional components not shown in example computing system 104 of FIG. 8.

As shown in the example of FIG. 8, computing system 104 includes processing circuitry 205, one or more input components 213, one or more communication units 211, one or more output components 201, and one or more storage components 207. In one example approach, storage components 207 of computing system 104 include CNN 212. Communication channels 215 may interconnect each of the components 201, 203, 205, 207, 211, and 213 for inter-component communications (physically, communicatively, and/or operatively). In some examples, communication channels 215 may include a system bus, a network connection, an inter-process communication data structure, or any other method for communicating data.

One or more communication units 211 of computing system 104 may communicate with external devices, such another of computing devices 102 of FIG. 1A, via one or more wired and/or wireless networks by transmitting and/or receiving network signals on the one or more networks. Examples of communication units 211 include a network interface card (e.g., such as an Ethernet card), an optical transceiver, a radio frequency transceiver, a GPS receiver, or any other type of device that can send and/or receive information. Other examples of communication units 211 may include short wave radios, cellular data radios, wireless network radios, as well as universal serial bus (USB) controllers.

One or more input components 213 of computing system 104 may receive input. Examples of input are tactile, audio, and video input. Input components 213 of computing system 104, in one example, includes a presence-sensitive input device (e.g., a touch sensitive screen), mouse, keyboard, voice responsive system, video camera, microphone or any other type of device for detecting input from a human or machine. In some examples, input components 213 may include one or more sensor components one or more location sensors (GPS components, Wi-Fi components, cellular components), one or more temperature sensors, one or more movement sensors (e.g., accelerometers, gyroscopes), one or more pressure sensors (e.g., barometer), one or more ambient light sensors, and one or more other sensors (e.g., microphone, camera, infrared proximity sensor, hygrometer, and the like).

One or more output components 201 of computing system 104 may generate output. Examples of output are tactile, audio, and video output. Output components 201 of computing system 104, in one example, includes a sound card, video graphics adapter card, speaker, liquid crystal display (LCD), or any other type of device for generating output to a human or machine.

Processing circuitry 205 may implement functionality and/or execute instructions associated with computing system 104. Examples of processing circuitry 205 include application processors, display controllers, auxiliary processors, one or more sensor hubs, and any other hardware configure to function as a processor, a processing unit, or a processing device. Processing circuitry 205 of computing system 104 may retrieve and execute instructions stored by storage components 207 that cause processing circuitry 205 to perform operations for processing holograms of particle fields. The instructions, when executed by processing circuitry 205, may cause computing system 104 to store information within storage components 207.

One or more storage components 207 within computing system 104 may store information for processing during operation of computing system 104. In some examples, storage component 207 includes a temporary memory, meaning that a primary purpose of one example storage component 207 is not long-term storage. Storage components 207 on computing system 104 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 207, in some examples, also include one or more computer-readable storage media. Storage components 207 in some examples include one or more non-transitory computer-readable storage mediums. Storage components 207 may be configured to store larger amounts of information than typically stored by volatile memory. Storage components 207 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 207 may store program instructions and/or information (e.g., data) associated with CNN 212.

Storage components 207 may include a memory configured to store data or other information associated with assisted learning protocol 209.

Clock 203 is a device that allows computing system 104 to measure the passage of time (e.g., track system time). Clock 203 typically operates at a set frequency and counts the ticks that have transpired since some arbitrary starting date. Clock 203 may be implemented in hardware or software.

Figure 9:
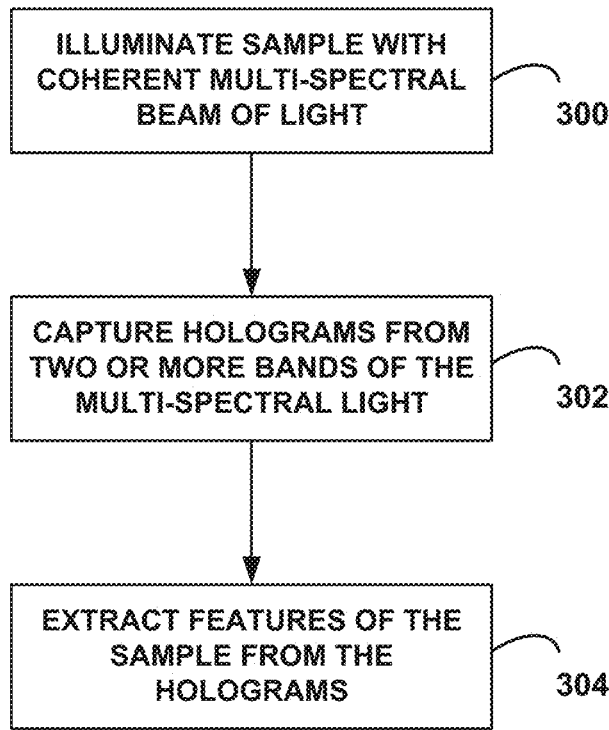
FIG. 9 is a flowchart illustrating using the multi-spectral DIH system of FIGS. 1A and 2 to characterize biological particles in a sample, in accordance with one aspect of the disclosure.

FIG. 9 is a flowchart illustrating using the multi-spectral DIH system of FIGS. 1A and 2 to characterize biological particles in a sample, in accordance with one aspect of the disclosure. In the example flowchart of FIG. 9, a sample in a sample container is illuminated with a coherent multi-spectral beam of light (300). Holograms generated via scattering of the light from biological particles in the sample in the sample container are captured by a camera (302). The holograms include holograms generated in two or more of the spectral bands of the multi-spectral beam of light. Features of the biological particles are then extracted from the holograms (304).

What has been described is a multi-spectral DIH system used to characterize the biochemical properties of biological particles (e.g., bacteria, fungi, spores, virus, pollen, etc.). The system consists of coherent light sources (e.g., lasers, pin-hole LEDs) illumination, an objective to magnify the images and a chromatic camera with Bayer filters to separate multi-spectral signal. A specially-design convolutional neuron network allows us to integrate the holographic information from holograms recorded under different spectral illuminations to capture biochemical properties with high accuracy.

The multi-spectral DIH system detects viability and other properties related to the change of biochemical composition of biological particles. In addition, it is capable to characterize samples without extra staining, labeling, or culturing, enabling high throughput and living cell analysis. It is also cost effective (<$10,000) and does not require for subsequent reagent supplies. The hardware described features a multi-spectral illumination light source and a chromatic camera, which allows simultaneous recording of biological particles responses from different wavelengths. According to the unique features of biological particle analysis (i.e., limited amount of data, different image appearances in comparison to the normal object classification tasks, and subtle differences of biological particles under different states), a convolutional neural network (CNN) based machine learning network has been designed for the biological particle analysis. Specifically, a customized multi-layer convolutional neural network combined with the skip connection and the Mish activation function is used to replace the original backbone network in the YOLOv5 architecture. Furthermore, a more advanced pooling method, i.e., cascaded hierarchical atrous spatial pyramid pooling (CHASPP) is implemented to upgrade the original spatial pyramid pooling method (SPP) used in the neck part. In addition, the circular bounding box is utilized for the cell localization and classification in the detection step, replacing the traditional rectangular bounding box. Moreover, a more robust method to generate training set is introduced into the process. Lastly, a new learning rate schedule is developed for the hologram type images for the training process of the model.

As a proof of concept, the system was used to characterize the fermentation process of two strains of yeast cells (i.e., *Saccharomyces cerevisiae* and *Saccharomyces pastorianus*) under four metabolic states, i.e., three time points (0 h, 1 h, 3 h) during the fermentation process and dead, using three-spectral DIH system. The results show that the proposed multi-spectral DIH system achieves an accuracy of above 96% for classifying four metabolic states and above 98% for classifying yeasts of different strains. This is about 10% increase compared to the best-performed single-spectral DIH (green laser DIH), and 30% increase compared to red laser DIH, for metabolic state classification.

Furthermore, the system has demonstrated the ability of the transfer learning using additional datasets of prostate cancer cells and white blood cells. By using the pretrained yeast cell model and an additional cancel cell dataset, the multi-spectral DIH system can train a model that can classify six types of cells with an average accuracy above 90%.

The work described above demonstrates improved specificity for biological particle characterization using the multi-spectral DIH vs single wavelength DIH. Specifically, the multi-spectral DIH approach can detect important characteristics of biological particles including viability, metabolism rate, strains, etc. Such approach can be extended to clinical and industrial applications including detecting circulating tumor cells (differentiate them from white blood cells with similar sizes), monitoring the lipid content in biofuel production algae, characterizing of live bacteria suspended in air that causes infection in surgical rooms, etc.

The specificity of our system for the characterization of biochemical properties may be further improved by incorporating coherent illumination with wavelength bands tuned according to the spectral response of biomolecules within the sample specimens.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a cassette, magnetic media, optical media, or other computer readable media.

What is claimed is:

1. A method for characterizing biological particles, the method comprising:

illuminating a sample with a coherent multi-spectral beam of light, the sample including one or more biological particles;

capturing holograms defining a spectral response of the sample, the holograms produced by interference of (i) light from the coherent multi-spectral beam of light that was scattered by the sample with (ii) light from the coherent multi-spectral beam of light that was not scattered by the sample, wherein the captured holograms including holograms from two or more spectral bands; and applying a machine learning model to the spectral response defined by the captured holograms to extract features of the biological particles in the sample from the captured holograms.

2. The method of claim 1, wherein the features include one or more of biological particle localization, morphology characterization including size and shape, classification of different biological particle types, or results of biochemical analysis of the biological particles.

3. The method of claim 2, wherein classifications of different biological particle types including classifications of different species and different strains of the same species.

4. The method of claim 2, wherein results include viability and vitality of the biological particles.

5. The method of claim 1, wherein illuminating the sample with the coherent multi-spectral beam of light comprises feeding the multi-spectral beam of light into beam combining optics.

6. The method of claim 1, wherein applying a machine learning model to the spectral response of the holograms includes applying a trained convolutional neural network (CNN) to the holograms.

7. The method of claim 1, wherein applying a machine learning model to the spectral response of the holograms includes applying a trained you-only-look-once (YOLO) model to the holograms.

* * * * *